United States Patent [19]

Gilfoy et al.

[11] Patent Number: 4,782,292
[45] Date of Patent: Nov. 1, 1988

[54] PORTABLE SERVOACTUATOR TEST SYSTEM

[75] Inventors: Dennis Gilfoy, Fillmore; Charles S. McBride, Canoga Park, both of Calif.

[73] Assignee: HR Textron, Inc., Valencia, Calif.

[21] Appl. No.: 603,014

[22] Filed: Apr. 23, 1984

[51] Int. Cl.⁴ ............................................. G01R 31/00
[52] U.S. Cl. ............................... 324/158 R; 324/73 R
[58] Field of Search .......... 324/158 R, 73 R, 158 SY, 324/158 SM; 364/551, 424; 244/194, 195, 1 R; 434/30, 37, 49

[56] References Cited

U.S. PATENT DOCUMENTS 2,963,652  12/1960  Taylor et al. ......................... 324/73
3,688,099  8/1972  Buscher ............................. 244/195
4,441,359  4/1984  Ezoe ................................. 364/551

Primary Examiner—Ernest F. Karlsen
Assistant Examiner—Yinh Nguyen
Attorney, Agent, or Firm—Nilsson, Robbins, Dalgarn, Berliner, Carson & Wurst

[57] ABSTRACT

A portable system which is used to accomplish in situ testing of actuators on aerospace vehicles. The test system includes a control interface allowing an operator to select specific predetermined tests to be conducted upon servoactuators. A microcomputer controls the sequencing of the tests, the results of which are compared to predetermined tolerance limitations to ascertain whether or not the actuator being tested is faulty.

3 Claims, 5 Drawing Sheets

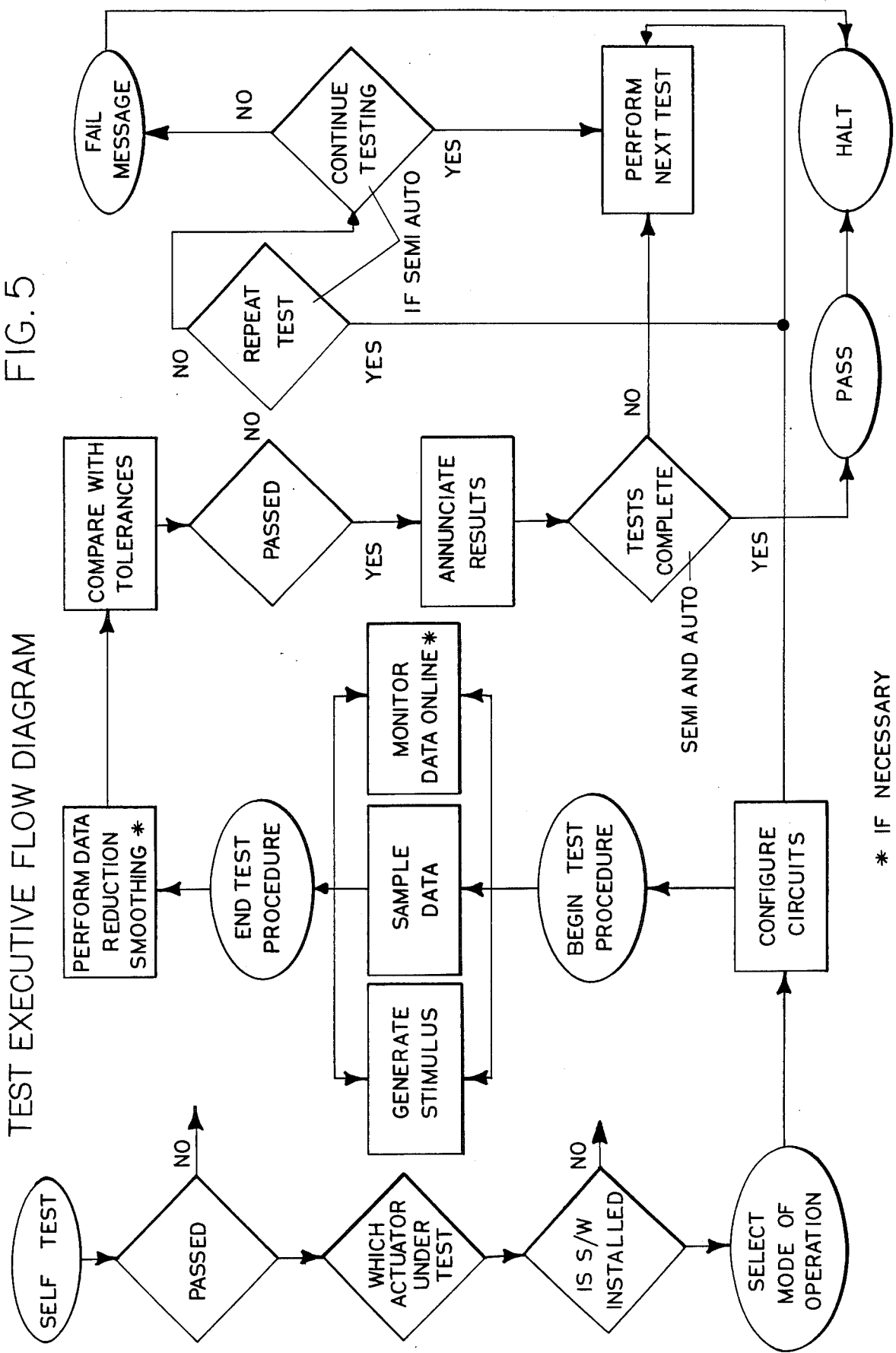

PORTABLE SERVOACTUATOR TEST SYSTEM

BACKGROUND OF THE INVENTION

1. Field of the Invention

This invention relates generally to the testing of actuators and more specifically to the in situ testing of actuators which drive flight control surfaces.

2. The Prior Art

In the prior art it has been the standard practice to remove actuators from aircraft for repair and maintenance upon any indication of a malfunction thereof. In practice it has been determined that in approximately 60% to 80% of the removed actuators no fault was found. It was determined after removal that the actuator was operable and fell within the test tolerances provided. As a result, a substantial amount of aircraft downtime, personnel time for removal and installation and test time was needlessly consumed. Obviously, such a procedure was necessary in the absence of any way to reliably ascertain whether the malfunction indication or flight anomaly was attributable to the actuator or otherwise.

SUMMARY OF THE IVENTION

A portable testing system for on-board flight line testing of aircraft electro-servoactuators which includes cable menas for interconnecting the system to the on-board servoactuators for testing by way of selecting one of a plurality of the on-board servoactuators and applying in a selectively sequential manner a plurality of electrical command signals simulating flight control of the actuator and comparing the test signal results from the actuator with operational tolerances to ascertain the performance of the servoactuator.

BRIEF DESCRIPTION OF THE DRAWINGS

FIG. 5 is a flow chart showing the operation of the test executive portion of the system of the present invention.

DESCRIPTION OF THE INVENTION

Figure 1:
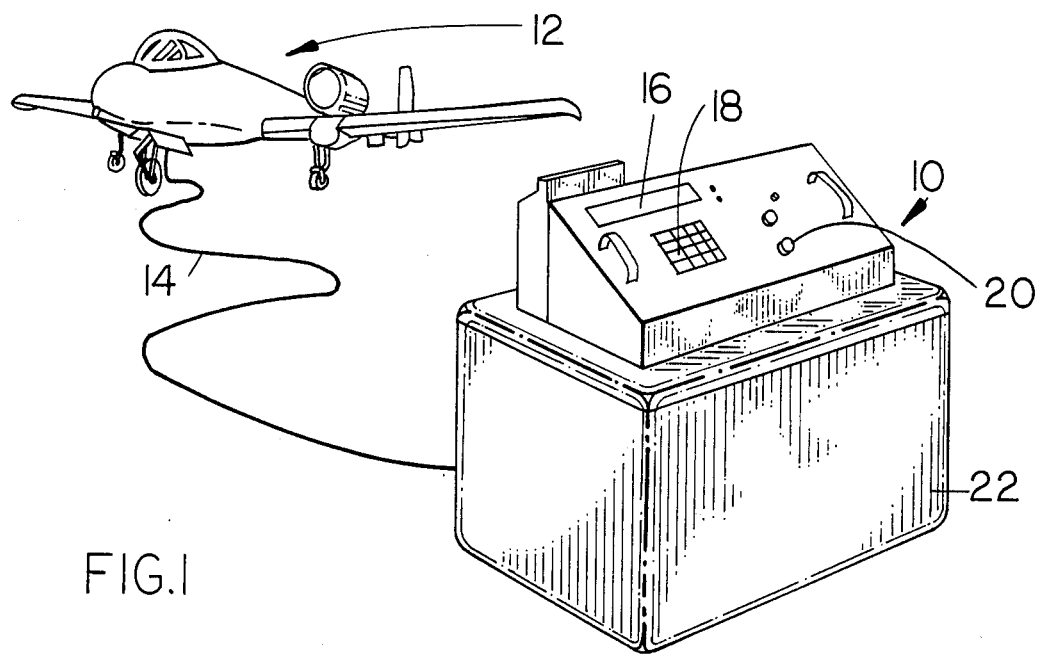
FIG. 1 is a pictorial representation illustrative of the portable servoactuator test system connected to an aircraft for flight line testing.

In both commercial and military applications it is desirable to maintain aircraft in an operational flight condition readiness for as long an uninterrupted period as is possible. It is obviously necessary to immediately remove, for repair or replacement, any component from an aircraft which appears to be malfunctioning to preserve the integrity of the aircraft and the safety of the flight personnel and passengers. If, however, components are unnecessarily removed from the aircraft, the aircraft is unnecessarily removed from an operational configuration, at least for the period of time required to remove and replace the component.

In accordance with the present invention a portable (to the extent of being hand-conveyable) test unit 10 is provided which may be taken upon the flight line and connected to an aircraft 12 by means of a cable 14 for the purpose of testing actuators installed in the aircraft. Such actuators are typically connected to various of the flight control surfaces, wheels, wheel wells, cowlings and other operational aspects of the aircraft which are electro-mechanical or electro-hydraulically actuated. The test system 10 generates electrical signals which simulate control conditions of the aircraft in flight and receives signals from the actuators which indicate responsiveness thereof to the command test signals. The signals thus produced in response to the command signals are compared to operational tolerances maintained within the test system memory. An output indication is provided which shows the operational status of the actuator under test.

The portable test system 10 includes a visual output 16 which the operator may view to conduct the required tests on the actuators in situ on the aircraft. A key pad 18 is also provided which the operator may utilize in configuring the various internal portions of the test system 10 to provide the appropriate test command signals (or stimulus) for the particular actuator which has been selected for testing. Appropriate switches and visual indication devices 20 are also provided to assist the operator in setting up and conducting the tests to be performed on the actuators on the aircraft 12 while retaining the actuators in their normal operating environment on the aircraft. The system 10 is confined within a housing 22 which is readily and easily portable from aircraft to aircraft upon the flight line for purposes of conducting the desired tests to ascertain the operational status of the actuator or actuators under question.

Figure 2:
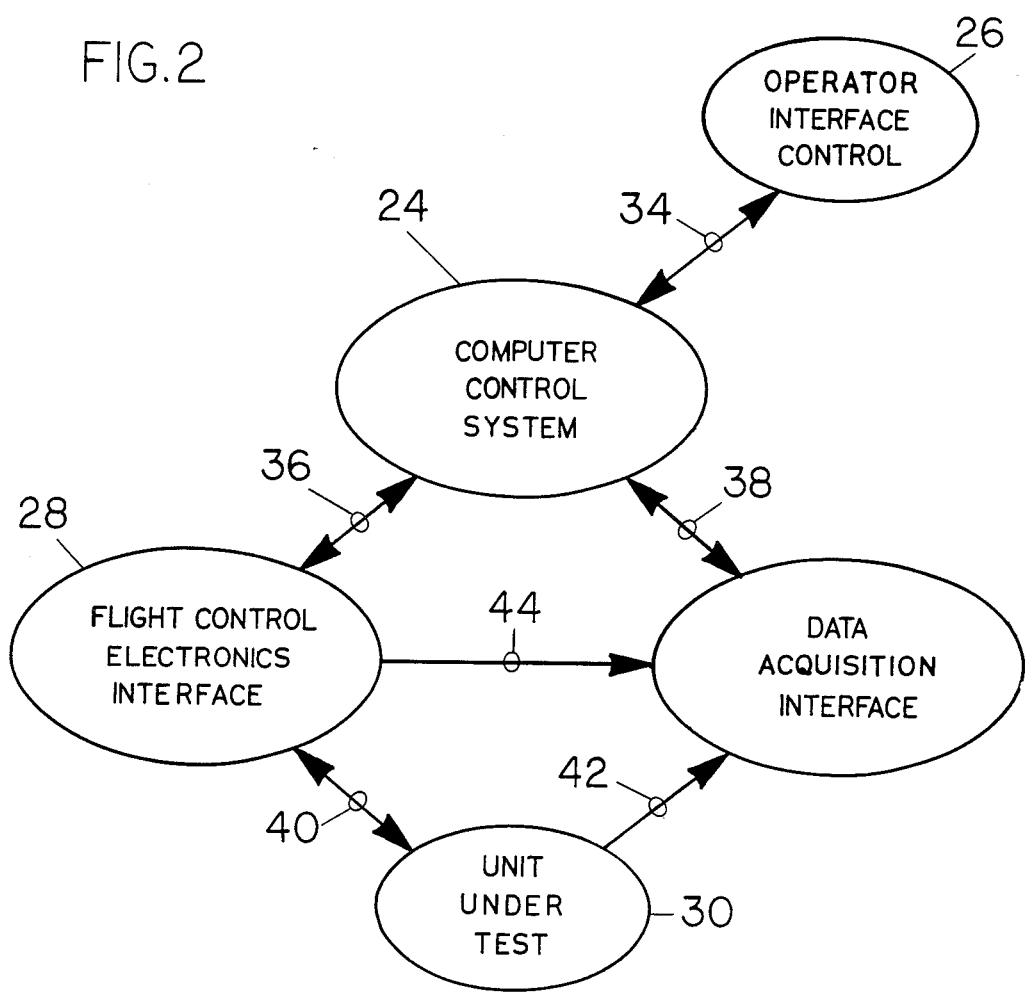
FIG. 2 is a schematic block diagram representative of the portable servoactuator test system of the present invention and illustrating functional positioning thereof.

By reference to FIG. 2 it can be seen that the portable servoactuator test system 10 constructed in accordance with the present invention is basically comprised of a computer control system (CCS) 24 which is controlled by the operator through an operator interface control (OIC) 26 through the interconnect cable 34 therebetween. The computer control system is connected by way of an interconnect cable 36 to the flight control electronics interface (FCEI) 28 and also by way of the interconnect cable 38 to the data acquisition interface (DAI) 32. The unit under test (UUT) 30 is connected with the flight control electronics interface 28 by way of the cable interconnect 40 and also with the data acquisition interface 32 by way of the interconnect cable 42. An interconnect cable 44 also interconnects the flight control electronics interface 28 with the data acquisition interface 32. The CCS includes, preferably, a microprocessor, memory and decoding circuits and forms the heart of the portable servoactuator test system. The CCS issues commands to individual circuit modules which in turn interface with the operator and with the UUT. The CCS receives the return test result signals from the UUT 30 as well as signals that are generated internally by the test system while the tests are being performed upon the UUT 30. The information received is then processed to determine whether the UUT falls within the predetermined tolerances programmed within the system and thus has passed a selected test. Depending upon the operating mode which the operator has selected, the system then proceeds automatically to the next programmed test or alternatively awaits input instructions from the operator.

The FCEI 28 contains those circuits which interface directly with the actuator under test. The FCEI receives commands from the CCS 24 and responsively thereto generates the appropriate electrical signals and applies them to the individual components such as servovalves, solenoids and the like which form parts of the actuators which are the UUT'S 30. If desired, the FCEI 28 may incorporate a slave microprocessor which is used as a stand alone servocommand generator to generate various command signals for testing the UUT 30 thus relieving the CCS 24 of that requirement. The FCEI 28, in response to commands from the CCS 24, is reconfigured to provide the desired command test signals appropriate for the specific UUT 30 which has been selected for testing.

The DAI 32 performs the conditioning, switching and conversion of analog signals. A multiplexer circuit routes the various signals to an appropriate analog-to-digital converter which converts the analog signals to appropriate digitized information which is presented to the CCS. In addition to measuring the output signals from the UUT 30 the DAI also samples the internally generated signals for system self-testing and the like.

The OIC 26 contains all of the key pad and display portions of the unit. For outputting information through the display the CCS writes appropriate encoded data to the OIC which in turn interfaces with the input/output device. The OIC also toggles the interrupt line of the CCS when an input from the key pad is received. The CCS will then either ignore the request or interpret the input depending upon the test mode which has been selected by the operator.

Figure 3:
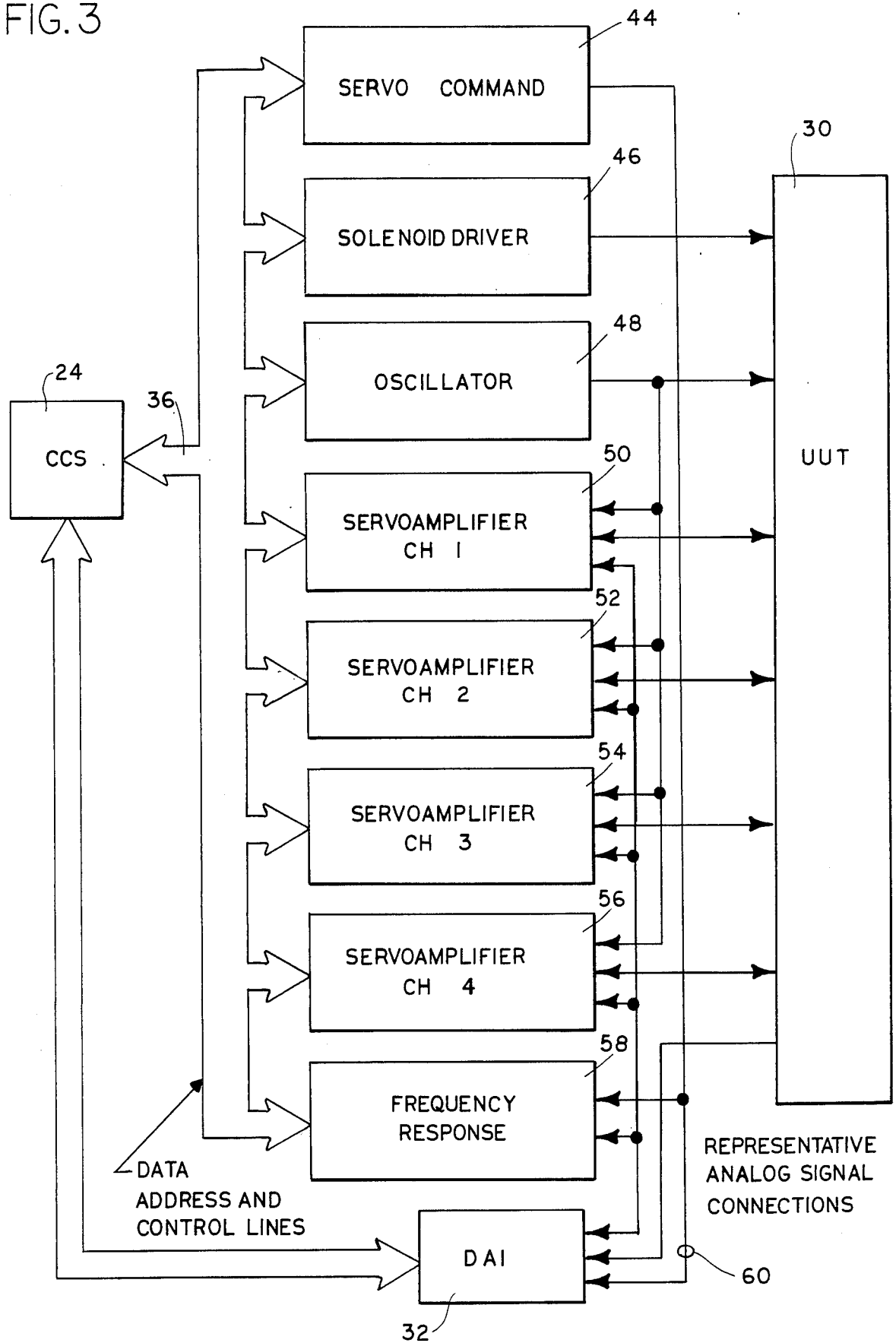
FIG. 3 is a block diagram showing the flight control electronic interface of the present system.

By reference now to FIG. 3, there is illustrated a functional block diagram of the flight control electronics interface 28 illustrating the manner in which it is interconnected between the CCS and the UUT and as well the cooperative interconnections between the FCEI and the DAI 32. As is therein shown the CCS 24 is interconnected by the interconnecting cable 36 to various electronic circuits which receive commands from the CCS and generate appropriate signals at appropriate times which are in turn then applied through additional circuits as input and/or output signals ultimately responsible for providing command test signals to the UUT 30. For example, the servocommand 44 provides a signal which is connected to the frequency response 58 and the DAI 32 while the solenoid driver 46, in response to signals from the CCS 24, provides a signal directly to the UUT 30. An oscillator 48 generates signals responsive to commands from the CCS which are applied to the UUT 30 as well as to servoamplifiers 50 through 56 which in turn generate signals responsive to commands from the CCS and in response to appropriate information by way of command signals and feedback signals from the UUT 30 for appropriate commands to the UUT 30. The signals generated by the UUT 30 in response to the various command test signals which are applied to it in a selective sequential basis in response to the CCS 24 are then applied as analog signals over the appropriate interconnect cable 60 to the DAI 32 for proper processing as will be more fully described below.

By way of further detail with respect to the FCEI the servocommand 44 is a separate module which functions as a stand alone signal generator. The servocommand 44 is capable of generating a signal from among a set of preprogrammed wave forms stored in the memory of the test system. The CCS commands which wave form is to be generated in accordance with a specific test which has been selected with regard to a particular UUT. The wave form is clearly specified by frequency, peak-to-peak voltage and other parameters well known to those skilled in the art. Once the servocommand 44 is appropriately configured, responsive to signals from the CCS, the signals generated are then outputted to the servoamplifiers 50 through 56. As a result, the CCS is removed from the command loop insofar as the generation of such signals is concerned until the CCS issues a halt instruction to the servocommand 44. In accordance with a preferred embodiment of the present invention the servocommand 44 constitutes a parallel data link with the CCS. It also is capable of generating a sinusoidal, triangle, ramp or step command signal. All of the output signals are variable in amplitude and/or frequency.

The servoamplifiers 50 through 56 drive the servovalves which are part of the UUT and provide appropriate control of feed forward and feedback gains. As is noted, four servoamplifiers are incorporated into the preferred embodiment of the test system of the present invention. Depending upon the requirements of the particular UUT, any or all of these servoamplifiers may be activated simultaneously. The servoamplifiers are designed to accommodate any test scenario which requires a controlled current output.

The solenoid driver 46 is utilized to energize solenoids which are present as part of the operational mechanism of the UUT 30. The solenoid driver provides the appropriate voltage as required to energize any or all of the eight solenoids of the UUT.

The oscillator 48 provides an appropriate sine wave signal having the desired frequency and voltage for excitation of the linear variable differential transformer (LVDT) present in the UUT.

A frequency response 58 enables the CCS to derive amplitude ratio and phase information. In the frequency response test a small sinusoidal signal is generated by the servocommand 44 to drive the servovalves of the UUT. The response of the UUT as indicated by the demodulated position LVDT (or RVDT) is sampled simultaneously with the output of the servocommand. The sampling is done on the frequency response with dual sample-and-holds. During each sampling cycle the DAI 32 serially converts the two signals and presents this information to the CCS. An appropriate algorithm is used to evaluate actuator response to discrete frequency commands.

Figure 4:
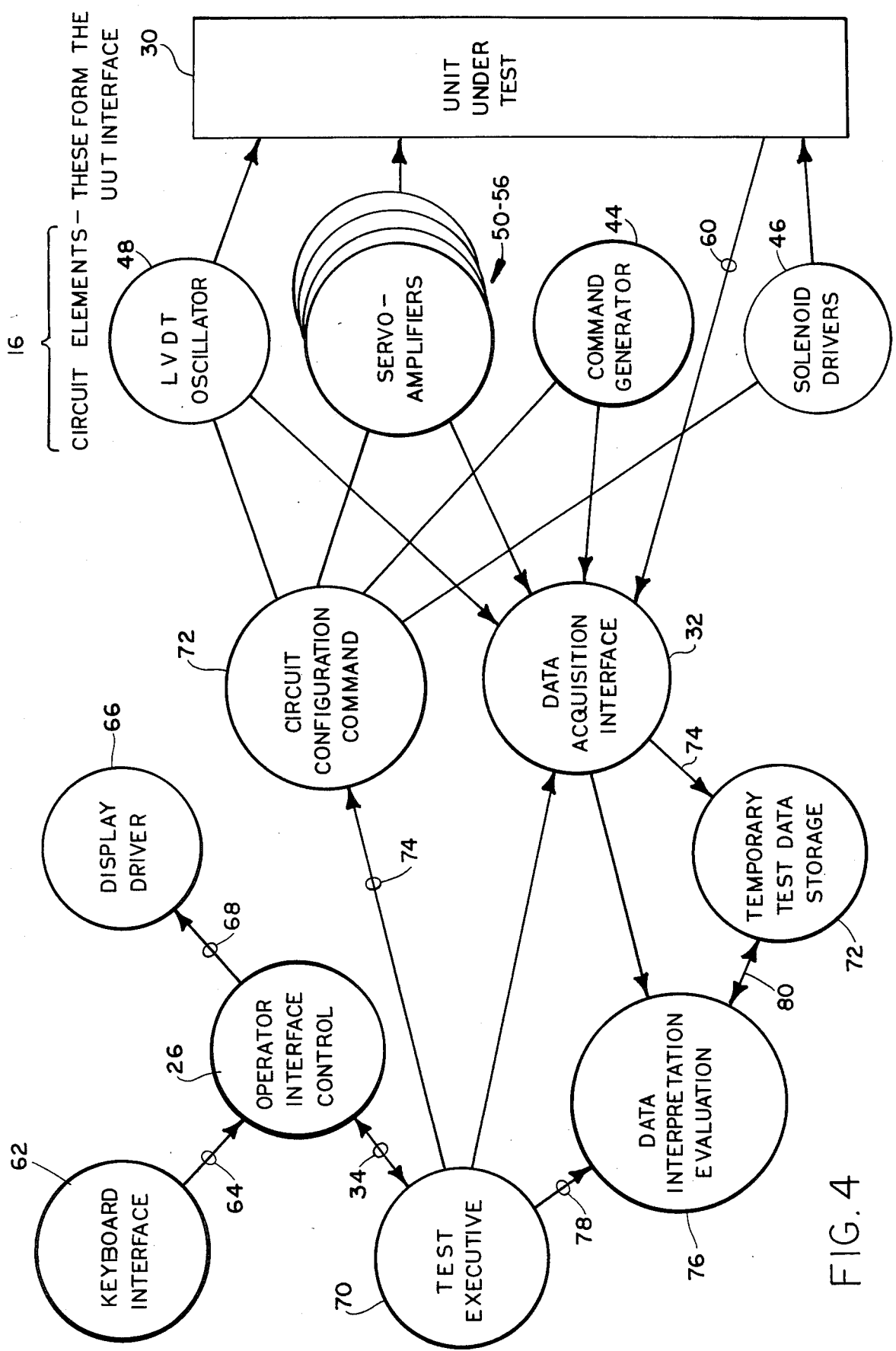
FIG. 4 is a schematic data flow diagram in more detail showing the system of the present invention.

By reference now to FIG. 4 the portable servoactuator test system in accordance with the present invention is shown schematically in further detail. As is therein shown the keypad interface 62 is connected by way of interconnect cable 64 to the operator interface control (OIC) 26. The OIC 26 in turn is connected to hhe display driver 66 by way of the interconnect cable 68. The key pad interface and the display driver thus may be viewed as a part of the OIC 26 which in turn is utilized to provide communication between the operator and the CCS through interconnect cable 34. As the operator identifies the UUT to be tested, keys in the desired test to be run, and commands the CCS to commence the testing procedures, these signals are passed by way of the interconnect cable 34 to a test executive 70 which forms a part of the CCS 24. The test executive effectively functions to oversee and control the various operations which are to occur during the test sequence.

In response to appropriate signals from the OIC 26, the test executive 70 generates appropriate command signals and applies the same to the circuit configuration command 72 by way of the interconnect cable 74. The circuit configuration command 72 instructs the various circuits such as the solenoid driver 46, the servoamplifiers 50-56 and the LVDT oscillator 48 to provide the appropriate signals to be connected to the UUT. Such is further enhanced by the servocommand generator 44 which functions as above described.

As will be appreciated and as above discussed as the UUT responds to the various signals applied thereto, in response to the test executive commands, test response signals are generated. These signals are accumulated by the DAI 32. The DAI consists of appropriate circuits for the multiplexing of the various analog signals generated as a result of the test. The DAI also includes an analog-to-digital converter for converting the analog signals received from the UUT to appropriate digital words. Inputs to the DAI include both the outputs of the UUT and the internally generated signals such as those from the servocommand generator. A provision is also made to measure the differential values of incoming signals. A typical sampling cycle begins with the issue of a command by the CCS directing the multiplexer to switch an analog signal to an input buffer circuit. The CCS then signals the ADC (analog-to-digital converter) to begin conversation. Upon end of converation, the CCS reads the data from a parallel input/output device. The DAI can respond to sample rates of several thousand samples per second in accordance with a preferred embodiment of the present invention.

In accomplishing the data acquisition/conversion the information acquired by the DAI 32 may be applied to a temporary test data storage buffer 72 by way of the interconnect cable 74. Upon appropriate command from the test executive to the data interpretation/evaluation module 76 over the interconnect cable 78, the data temporarily stored is transmitted over the interconnect cable 80 to the interpretation/evaluation circuit. The data interpretation/evaluation circuit, upon receipt of the data, appropriately processes it and compares the data to test tolerances which are stored therein. If the data as thus received and converted falls within the appropriate test tolerances, the test executive receives a signal indicative thereof which may in turn be conveyed to the display driver 66 for view by the operator or if desired may be utilized as a signal to the test executive 72 to step the circuit configuration command 72 to the next test to be performed on the UUT 30.

The operation of the test executive 70 is further illustrated by the flow diagram which is provided in FIG. 5. As is therein shown the operator selects the particular test to be performed and instructs the portable servoactuator test system to commence the test procedure. First, the unit self-tests by generating appropriate signals and measuring the desired responses. If the self-test is passed then the operator is instructed to select the particular actuator to be tested subsequent to the selection by the operator and the entry of the information on the key pad and then into the unit. The system takes an inventory of the test routines stored in memory and indicates whether the appropriate software to test the desired UUT has been installed.

Upon indication that such in fact has occured, the operator selects the mode of operation, that is, whether automatic or semi-automatic testing is to occur. If the automatic testing is to occur, the system functions to continue to apply the appropriate test to the particular actuator under test until there is an indication of a malfunction or failure to meet the test. Subsequent to selection of the mode of operation, the test executive instructs the circuit configuration command to configure the circuits in accordance with a particular actuator under test and the signals which are to be applied thereto. Subsequently the test procedure begins. As the test procedure begins, the various circuits generate the output command test signals as above described and as such occurs the data generated by the UUT is appropriately sampled by the DAI and the data which is being generated on-line may also be sampled or monitored if such is desired or necessary. Subsequent to the end of the test procedure data is then interpreted and evaluated and compared with the tolerances which are stored in the memory. If the unit passes or fails an indication is provided to the operator If the unit has failed to pass the test and the semiautomatic mode was chosen, then the operator is asked whether the test should be repeated or not. Under some circumstances the operator may be provided with a readout of the parameter which was found to be out of tolerance. If an affirmative is provided, then the test is again performed upon the UUT. If the operator indicates negative to whether the test should be repeated, then the question is asked of the operator as to whether the testing should be continued with the next sequential test which has been selected. The operator may then decide yes or no. If yes, the next test is performed. If no, then the unit is instructed to halt the testing process. If, however, the unit passes the tests and the results are positive then the tests, if not completed, would provide an output signal to perform the next sequential test among those which have been selected. This would continue until such a time as the tests were completed at which time a final unit pass indication would be given with an instruction to the system to halt the testing.

Figure 6A:
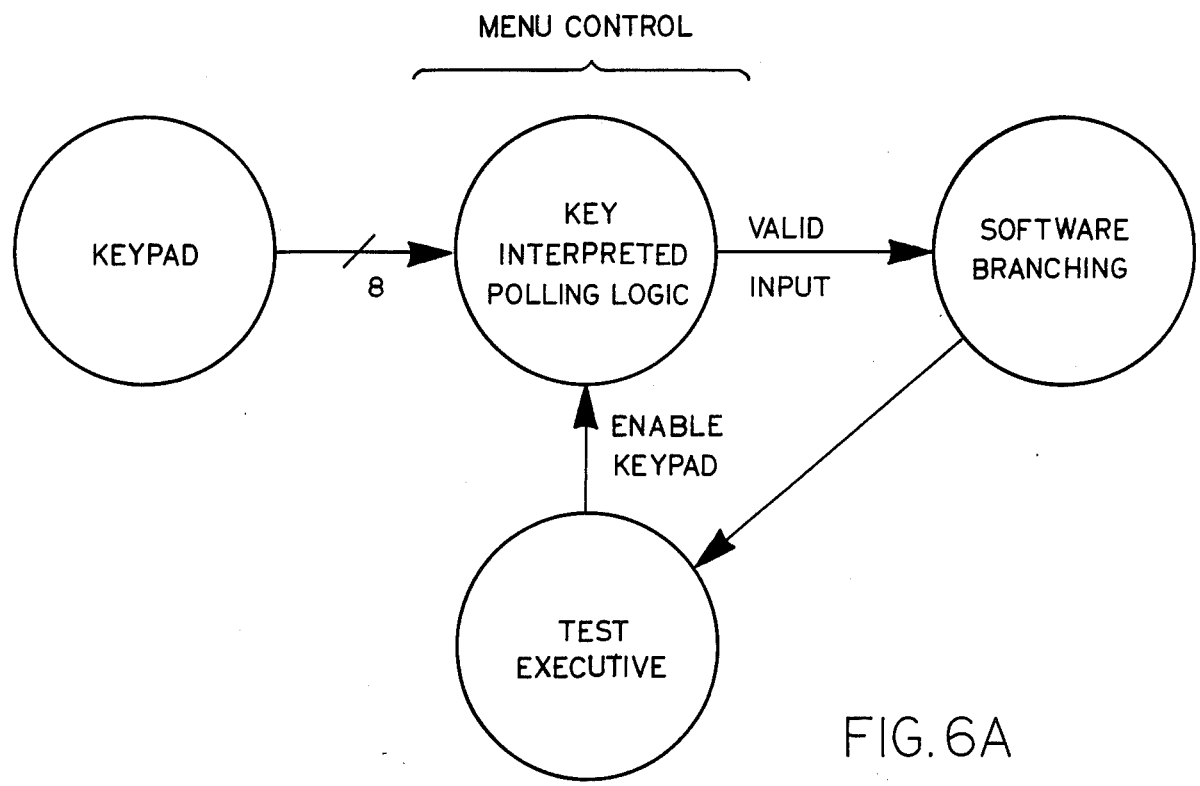
FIGS. 6A and 6B are block diagrams showing the operator interface portion of the system constructed in accordance with the present invention.
Figure 6B:
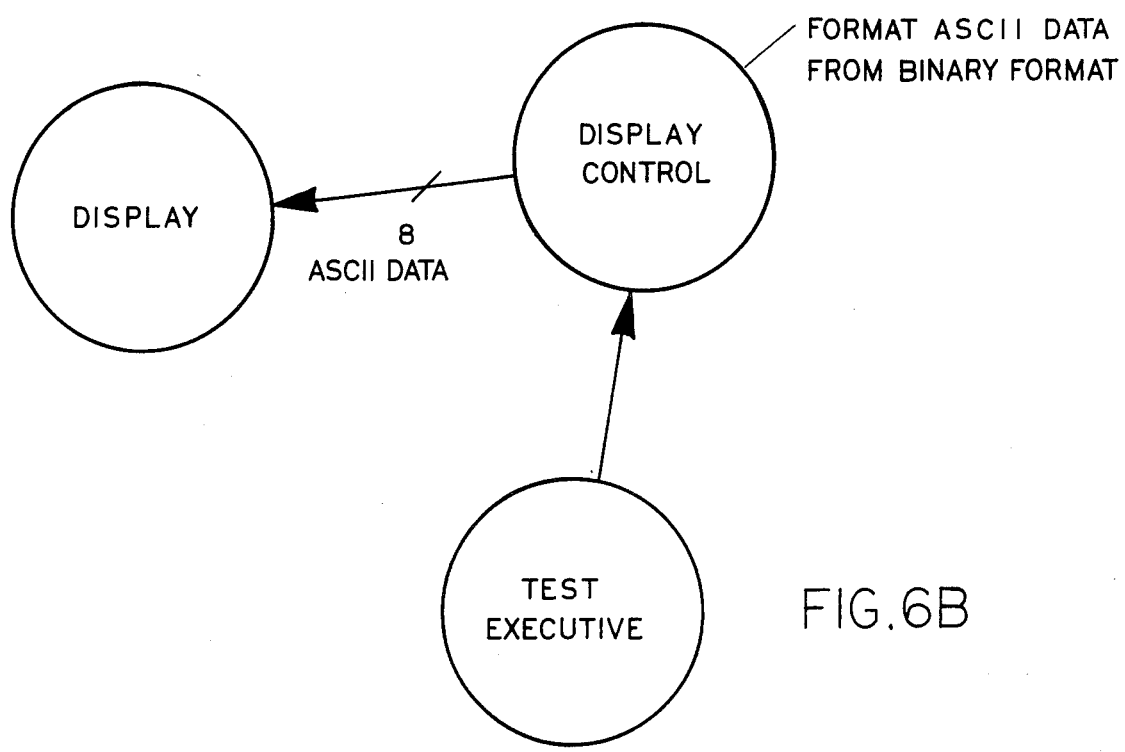

The various instructions which are provided by the operator through the OIC are further illustrated in FIGS. 6A and 6B. As can be seen, the key pad provides an interconnection to the CCS to interpret the input to determine whether or not they are balanced. If such is the case, then the inputs are affirmed and applied to the CCS which in turn instructs the test executive that valid inputs have been received which in turn permits the unit to appropriately interact. The test executive provides an enable key pad signal to the key interpreter so that as inputs from the key pad are received they can only be interpreted when the key pads have been enabled by the test executive. Thus the key pad cannot be utilized to interrupt a particular sequence of operations until it has been appropriately enabled. As shown in FIG. 6B the test executive also controls the display to receive and apply the appropriate binary digital information to the display control which then coverts that information to the appropriate signals which may be applied to the display driver and subsequently to the display for view by the operator.

As will be seen by those skilled in the art there has been disclosed an appropriate portable servoactuator test system which may be interconnected to an aircraft on flight line without mechanically or hydraulically disconnecting the particular servoactuator to be tested from the aircraft. As a result, an in situ flight line test may be run on the selected actuators on the aircraft to determine its operability thereby precluding false removal of actuators from aircraft, reducing the amount of time to troubleshoot flight control problems, enhancing the flight readiness posture of aircraft and reducing the proliferation of specialized test equipment.

What is claimed is:

1. A portable testing system for use by an operator for onboard flight line testing of servoactuators on aircraft comprising:
   (A) a housing containing the portable system;
   (B) cable means for interconnecting said system to an aircraft to provide electrical signals simulating flight control for testing preselected servoactuators on said aircraft;
   (C) means for selecting one of a plurality of servoactuators on said aircraft including an interface means for use by the operator and for selecting a sequence of test to be applied to said selected actuator for testing said selected actuator without mechanically disconnecting said selected actuator from said aircraft;
   (D) means for generating a plurality of electrical command signals simulating flight control of said servoactuator which has been selected for testing;
   (E) means for selectively sequentially applying said plurality of electrical command signals to said preselected servoactuator for causing said actuator to react responsively thereto;
   (F) means for receiving from said actuator test results electrical signals generated responsive to reactions of said actuator to said command signals;
   (G) means for comparing said test results signals to predetermined tolerance values to ascertain operability of said selected servoactuator;
   (H) means for automatically applying the next sequential command signal when the compared test results are within said predetermined tolerances;
   (I) means for automatically stopping said sequential application of said command signals responsive to said test results being outside said tolerances; and
   (J) means for providing an indication to an operator that said selected actuator has failed to provide signals within said tolerances.

2. The portable system as defined in claim 1 which further includes means for temporarily storing said test result signals.

3. The portable system as defined in claim 1 which further includes means for generating signals for self-testing said system prior to generating command signals for application to said servoactuators.

* * * * *